(12) United States Patent
Yagi et al.

(10) Patent No.: US 8,394,515 B2
(45) Date of Patent: *Mar. 12, 2013

(54) GLASS SUBSTRATE FOR INFORMATION RECORDING MEDIUM AND METHOD FOR PRODUCING THE SAME

(75) Inventors: Toshitaka Yagi, Sagamihara (JP); Naoyuki Goto, Sagamihara (JP)

(73) Assignee: Ohara Inc., Sagamihara-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,629

(22) Filed: Feb. 23, 2010

(65) Prior Publication Data

US 2010/0215993 A1    Aug. 26, 2010

(30) Foreign Application Priority Data

Feb. 24, 2009  (JP) .................................. 2009-041515

(51) Int. Cl.
*G11B 5/73* (2006.01)
*C03B 27/00* (2006.01)

(52) U.S. Cl. ......... 428/846.9; 360/135; 501/62; 65/60.1

(58) Field of Classification Search ............... 428/846.3, 428/846.9, 848.1, 848.2, 848.8, 64.3, 410, 428/426; 501/4, 5, 9, 10, 7, 62, 61, 114; 65/33.1, 61, 60.1; 365/222, 97.11; 427/127; 360/135

See application file for complete search history.

(56) References Cited

U.S. PATENT DOCUMENTS

| | | | |
|---|---|---|---|
| 4,746,633 A | 5/1988 | Mazeau et al. | |
| 5,432,130 A | 7/1995 | Rheinberger et al. | |
| 5,804,520 A * | 9/1998 | Morinaga et al. | 501/4 |
| 6,034,011 A * | 3/2000 | Yamaguchi et al. | 501/4 |
| 6,121,175 A | 9/2000 | Drescher et al. | |
| 6,306,784 B1 | 10/2001 | Drescher et al. | |
| 6,306,786 B1 | 10/2001 | Koyama et al. | |
| 6,383,645 B1 * | 5/2002 | Goto et al. | 428/426 |

(Continued)

FOREIGN PATENT DOCUMENTS

| | | |
|---|---|---|
| CA | 2239861 | 12/1998 |
| EP | 0885606 | 12/1998 |

(Continued)

*Primary Examiner* — Kevin M. Bernatz
*Assistant Examiner* — Louis Falasco
(74) *Attorney, Agent, or Firm* — Fox Rothschild LLP

(57) ABSTRACT

There is provided a glass substrate which has the properties required in the use as a substrate for an information recording medium of the next generation such as a perpendicular magnetic recording system, and can be applied as a substrate for an information recording medium of the next generation particularly on the premise of using the glass substrate in a dynamic environment. More particularly, there is provided a glass substrate for an information recording medium which has sufficiently high surface hardness, has a good balance between specific gravity and mechanical strength, and has high strength to withstand high speed rotation or drop impact, and which can be produced with a high productivity adequate for a direct press method, without the occurrence of bubbles in the glass blank or reboil upon pressing even if arsenic components or antimony components are not substantially used. A glass substrate for an information recording medium, includes, as expressed in terms of percent by mass on the oxide basis: 52 to 67% of $SiO_2$, 3 to 15% of $Al_2O_3$, and 0.2 to 8% of $P_2O_5$, the glass substrate having a Young's modulus of 85 GPa or greater, a specific gravity of 2.60 or less, and a ratio of Young's modulus to specific gravity (Young's modulus/specific gravity) of 33.0 or greater.

7 Claims, 2 Drawing Sheets

U.S. PATENT DOCUMENTS

| | | | |
|---|---|---|---|
| 6,420,288 B2 * | 7/2002 | Schweiger et al. | 501/7 |
| 6,426,311 B1 | 7/2002 | Goto et al. | |
| 6,582,826 B1 * | 6/2003 | Goto et al. | 428/426 |
| 6,645,891 B2 * | 11/2003 | Nagata et al. | 501/5 |
| 6,673,729 B2 * | 1/2004 | Siebers et al. | 501/4 |
| 6,703,332 B2 * | 3/2004 | Peng et al. | 501/5 |
| 6,819,526 B2 * | 11/2004 | Kataoka et al. | 360/97.11 |
| 6,998,361 B2 | 2/2006 | Lewis | |
| 7,465,686 B2 * | 12/2008 | Comte | 501/4 |
| 7,476,633 B2 * | 1/2009 | Comte et al. | 501/7 |
| 8,114,795 B2 * | 2/2012 | Yagi et al. | 501/5 |
| 2001/0007723 A1 * | 7/2001 | Tokumoto | 428/484.9 |
| 2001/0056022 A1 * | 12/2001 | Nagata et al. | 501/9 |
| 2002/0031670 A1 * | 3/2002 | Goto et al. | 501/4 |
| 2002/0108400 A1 * | 8/2002 | Watanabe et al. | 65/61 |
| 2002/0197437 A1 * | 12/2002 | Hashimoto et al. | 428/64.3 |
| 2003/0166446 A1 | 9/2003 | Lewis | |
| 2004/0092379 A1 | 5/2004 | Lewis | |
| 2005/0096208 A1 * | 5/2005 | Zachau et al. | 501/9 |
| 2005/0162956 A1 * | 7/2005 | Ikenishi et al. | 365/222 |
| 2006/0040142 A1 * | 2/2006 | Zou et al. | 428/846.3 |
| 2007/0004578 A1 * | 1/2007 | Monique Comte | 501/4 |
| 2007/0093375 A1 * | 4/2007 | Nakajima | 501/4 |
| 2007/0129231 A1 * | 6/2007 | Comte | 501/4 |
| 2007/0224460 A1 * | 9/2007 | Matsumura et al. | 428/846.9 |
| 2007/0293386 A1 * | 12/2007 | Goto | 501/4 |
| 2008/0026927 A1 * | 1/2008 | Monique Comte | 501/7 |
| 2008/0241603 A1 * | 10/2008 | Isono | 428/846.9 |
| 2008/0268295 A1 | 10/2008 | Yagi | |
| 2009/0162608 A1 * | 6/2009 | Yagi et al. | 428/141 |
| 2009/0220824 A1 * | 9/2009 | Ikenishi et al. | 428/846.9 |

FOREIGN PATENT DOCUMENTS

| | | |
|---|---|---|
| EP | 2075237 | 7/2009 |
| JP | 62017039 | 1/1987 |
| JP | 10-001329 | 1/1998 |
| JP | 11-302033 | 11/1999 |
| JP | 2000-207730 | 7/2000 |
| JP | 2001305320 | 10/2001 |
| JP | 2002025760 | 1/2002 |
| JP | 2002025762 | 1/2002 |
| JP | 2004035406 | 2/2002 |
| JP | 2002-097037 | 4/2002 |
| JP | 2007-164901 | 6/2007 |
| JP | 2008115071 | 5/2008 |
| JP | 2008115072 | 5/2008 |
| JP | 2008-273779 | 11/2008 |

* cited by examiner

GLASS SUBSTRATE FOR INFORMATION RECORDING MEDIUM AND METHOD FOR PRODUCING THE SAME

CROSS-REFERENCE TO RELATED APPLICATION

This application is based upon and claims the benefit of priority from the prior Japanese Patent Application No. 2009-041515, filed on Feb. 24, 2009, the entire contents of which are incorporated herein by reference.

BACKGROUND OF THE INVENTION

1. Field of the Invention

The present invention relates to a glass substrate for magnetic information recording medium. More particularly, the present invention provides a glass substrate having the properties required of future information recording medium substrate, which glass substrate has low specific gravity, high Young's modulus and excellent Vickers hardness in response to the future densification of magnetic information recording media, as well as has a highly smooth surface roughness after processing and excellent head sliding properties.

The term "information recording medium" according to the present invention means a magnetic information recording medium that can be used in fixed type hard disks, removable hard disks or card type hard disks, which are used as the hard disks for personal computers; hard disks for digital video cameras, digital cameras or audio systems; hard disks for automobile navigators; hard disks for mobile telephones; or hard disks for various electronic devices.

2. Description of the Related Art

In order to cope with recent development of personal computers for multi-media purposes and to cope with handling of large amounts of data such as video files and audio files by digital video cameras, digital cameras and portable audio devices, there is a demand for magnetic information recording devices with larger capacities. As a result, it is increasingly required of magnetic information recording media to acquire higher recording density year after year.

In response to this, adoption and mass production of perpendicular magnetic recording system are in progress. This perpendicular magnetic recording system is required to have more excellent heat resistance of substrates and smoothness of surfaces than conventional systems. Furthermore, conventionally, most of magnetic information recording apparatuses are used in a static environment, such as in the use in personal computers; however, in recent years, more of the recording apparatuses are put to use in a dynamic environment, which is represented by portable audio devices and the like. For this reason, it is becoming increasingly important that substrates for information recording media of next generation have lower specific gravity so as to reduce the burden on spindle motors, and higher mechanical strength for preventing hard disk crash. However, having high mechanical strength and excellent mass producibility is in a contradictory relationship with having low specific gravity, and thus research is being conducted on how these factors can be put in balance in the substrates for information recording media of next generation, for which the use in a dynamic environment is taken into consideration.

Materials that are used in the substrates for information recording media include aluminum (Al) alloys, glass, crystallized glass and the like, and glass and crystallized glass have an advantage over Al alloys in view of having high Vickers hardness and the like. Furthermore, crystallized glass generally has an advantage over glass in view of having higher Young's modulus. However, in recent years, there is a demand for a higher level of post-processing surface smoothness, but it is becoming more difficult to obtain the required surface smoothness in the crystallized glass. On the other hand, conventional glass substrates are not sufficiently satisfactory in terms of the Young's modulus that is required of the substrates for information recording media of next generation, and even if those currently established processing technologies are applied, desired surface properties may not be obtained.

In the case of using glass materials, direct press method is utilized by which molten glass is directly pressed, in order to produce disk-shaped substrates having a thickness of 1 mm or less at low cost.

In the direct press method, arsenic or antimony components have been used as refining agents so as to remove bubbles from molten glass when glass is melted. In recent year, however, there are rising concerns about the adverse effects of the refining agents on human body and environment, and thus it is requested to reduce the content, or not to use the refining agents at all.

Japanese Patent Application Laid-Open (JP-A) No. 2005-302289 discloses a substrate for an information recording medium made of glass, but the substrate does not have sufficient Vickers hardness and does not have sufficiently satisfactory properties that are required for the use as a substrate for an information recording medium of the next generation. The substrate also tends to have a low ratio of Young's modulus to the specific gravity.

JP-A No. 2001-19467 proposes a crystallized glass for magnetic disks, but this crystallized glass exhibits a difference in processing or a difference in the etching rate between the precipitated crystals and the glass blank, so that the crystallized glass cannot sufficiently satisfy the surface properties of the currently required level of Ra<2 A (angstrom).

SUMMARY OF THE INVENTION

It is an object of the present invention to provide a glass substrate which has the properties required for the use as a substrate for an information recording medium of the next generation, which is represented by a perpendicular magnetic recording system or the like, and can be applied as a substrate for an information recording medium of the next generation particularly on the premise of using the glass substrate in a dynamic environment. More particularly, it is an object of the present invention to provide a glass substrate for an information recording medium, which has sufficiently high surface hardness, has a good balance between specific gravity and mechanical strength, and has high strength to withstand high speed rotation or drop impact, and which can be produced with a high productivity adequate for a direct press method, without the occurrence of bubbles in the glass blank or reboil upon pressing even if arsenic components or antimony components that are feared to cause adverse effects on human body and environment, are not substantially used.

The present inventors devotedly repeated experiments and studies to achieve the objects described above, and as a result, they found that when a glass substrate is produced by setting the content ranges of specific components constituting a glass, the specific gravity and Young's modulus of the glass, and the ratio of Young's modulus to specific gravity (this is a value determined by Young's modulus/specific gravity, and represents the difficulty of deformation of the material), to values in specific ranges, the glass substrate can be applied as a substrate for an information recording medium of the next generation. In addition, the inventors also found that the glass substrate has a highly smooth substrate surface which makes it possible to cope with a decrease in flying head of the magnetic head, and is also excellent in the drop strength (>1200 G) at the time of mounting in a drive. More specifically, the present invention provides the following.

(Constitution 1)

A glass substrate for an information recording medium, including, as expressed in terms of percent by mass on the oxide basis:

52 to 67% of $SiO_2$,
3 to 15% of $Al_2O_3$, and
0.2 to 8% of $P_2O_5$, the glass substrate having a Young's modulus of 85 GPa or greater, a specific gravity of 2.60 or less, and a ratio of Young's modulus to specific gravity (Young's modulus/specific gravity) of 33.0 or greater.

(Constitution 2)

The glass substrate for the information recording medium according to constitution 1, including, as expressed in terms of percent by mass on the oxide basis:

2.9% to 8% of $Li_2O$, wherein the total amount of MgO, CaO, ZnO, $ZrO_2$ and $TiO_2$ is 5 to 20%, and the total amount of $CeO_2$ and/or $SnO_2$ is 0.05% to 1%.

(Constitution 3)

The glass substrate for the information recording medium according to constitution 1 or 2, including, as expressed in terms of percent by mass on the oxide basis:

0 to 20% of MgO, and/or
0 to 10% of CaO, and/or
0 to 10% of ZnO, and/or
0 to 13% of $ZrO_2$, and/or
0 to 16% of $TiO_2$, and/or
0 to 6% of $B_2O_3$, and/or
0 to 10% of $Na_2O$, and/or
0 to 7% of $K_2O$.

(Constitution 4)

The glass substrate for the information recording medium according to any of constitutions 1 to 3, wherein the glass substrate does not contain $As_2O_3$ component and $Sb_2O_3$ component on the oxide basis, and $Cl^-$, $NO^-$, $SO_2^-$ and $F^-$ components.

(Constitution 5)

The glass substrate for the information recording medium according to any of constitutions 1 to 3, wherein the glass substrate does not contain BaO component or SrO component on the oxide basis.

(Constitution 6)

The glass substrate for the information recording medium according to any of constitutions 1 to 5, wherein, when the content ratio of $Li_2O$ component on the oxide basis in the region inside the glass substrate for the information recording medium which extends from an end surface to a depth of 5 μm toward the center is designated as α%, and the content ratio of the $Li_2O$ component on the oxide basis in the region in the glass substrate for the information recording medium which extends from beyond a depth of 5 μm from an end surface toward the center, within the region inside the glass substrate which extends from a depth of 5 μm from one main surface to a depth of 5 μm from the other main surface along the thickness direction, is designated as β%, the ratio of α/β is 1 or less.

(Constitution 7)

The glass substrate for the information recording medium according to any of constitutions 1 to 6, wherein the surface roughness Ra (arithmetic mean roughness) is 2 A (angstrom) or less.

(Constitution 8)

An information recording medium making use of the glass substrate for the information recording medium according to any of constitutions 1 to 7.

(Constitution 9)

A method for producing a glass substrate for an information recording medium, including producing a glass substrate containing, as expressed in terms of percent by mass on the oxide basis:

52 to 67% of $SiO_2$,
3 to 15% of $Al_2O_3$, and
0.2. to 8% of $P_2O_5$;

substituting the alkali ions present at the surface of the glass substrate with other ions to produce an ion exchange region; and eliminating the ion exchange region present at the two main surfaces of the glass substrate.

(Constitution 10)

The method for producing a glass substrate for the information recording medium according to constitution 9, wherein the substituting is achieved by substituting the alkali component present at the surface layer with an alkali component having a larger ionic radius.

(Constitution 11)

The method for producing a glass substrate for an information recording medium according to constitution 10, wherein the glass substrate is heated and then rapidly cooled, thereby forming a compressive stress layer at the surface.

According to the present invention, a glass substrate can have properties that are required in the use as a substrate for an information recording medium of the next generation, such as specific gravity, Young's modulus and Vickers hardness. In particular, the glass substrate has a good balance between specific gravity and mechanical strength on the premise of using the glass substrate in a dynamic environment as a substrate for an information recording medium of the next generation, and has high strength to withstand high speed rotation or drop impact. Furthermore, the glass substrate can acquire highly smooth surface properties by applying currently established processing technologies such as polishing. There can be also provided a glass substrate capable of offering more excellent effects than conventional ones, which can be refined even without using arsenic components or antimony components that are feared to cause adverse effects on human body and environment, and can also suppress the occurrence of reboil at the time of direct press molding or the like.

DETAILED DESCRIPTION OF THE INVENTION

Figure 1:
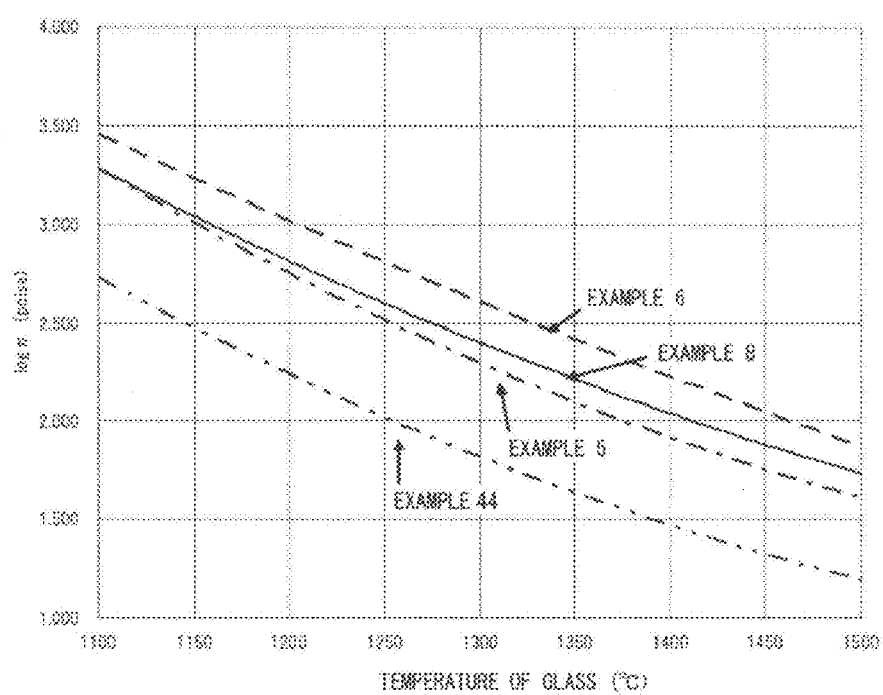
FIG. 1 is a graph plotting temperature against viscosity in the cases of Examples 5, 6, 8 and 44 of the present invention, wherein the vertical axis represents the logarithm of viscosity (dPa·s), log$\eta$, and the horizontal axis represents the temperature (° C.) of glass indicated by a drawing ball viscometer.
Figure 2:
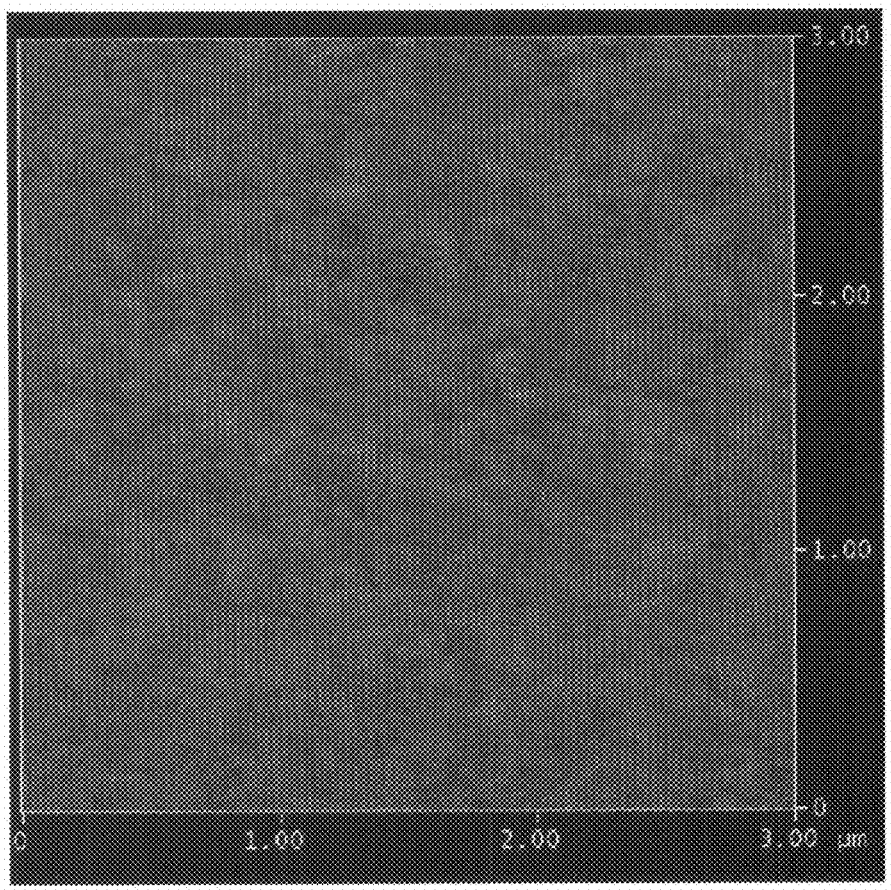
FIG. 2 is an image (field of vision 3 μm$^2$) obtained by observing with an AFM (atomic force microscope) a polished surface of the substrate for the information recording medium of the present invention.

The present invention will be described by way of specific exemplary embodiments.

The term "glass substrate" of the present invention as used herein generically refers to an amorphous glass substrate, and upon stating about the respective compositional components constituting this glass substrate, unless stated otherwise, the contents of the various components are expressed in terms of mass percent on the oxide basis. Here, the term "on the oxide basis" is directed to a method of indicating the composition of the respective components contained in the glass under an assumption that the oxides, carbonates and the like used as raw materials of the constituent components of the glass of the present invention are all decomposed upon melting and converted to the indicated oxides, and the amounts of the respective components contained in the glass are indicated on the basis of the total sum of mass of these produced oxides as 100 mass %.

The glass used in the glass substrate for the information recording medium of the present invention contains a $SiO_2$ component, an $Al_2O_3$ component and a $P_2O_5$ component at the proportions of specific ranges shown below.

The present inventors discovered, with regard to the composition range of the glass of the present invention, that it is preferable to maintain the specific gravity of the glass at 2.60 or less, in order to reduce the load exerted on a spindle motor and to obtain a good balance between specific gravity and mechanical strength that can be applied in the use as a substrate for an information recording medium of the next generation. In order to make the balance mentioned above even better, it is most preferable to maintain the specific gravity at 2.595 or less. On the other hand, if the specific gravity is lower than 2.20, it is substantially difficult to obtain a substrate having a desired toughness with the glass composition range of the present invention. Thus, it is preferable to maintain the specific gravity at 2.20 or greater, more preferably at 2.30 or greater, and most preferably at 2.35 or greater.

Young's modulus will be discussed. As described above, it is under way to make information recording medium disk substrates capable of high speed rotation, so as to improve the recording density and data transfer rate. However, in order to deal with this trend, the substrate material must have high toughness and low specific gravity to prevent disk vibration caused by bending upon high speed rotation. Furthermore, in the case of contact with a head or in the case of use in portable recording apparatuses such as removable recording apparatuses, it is preferable for the glass substrate to have a mechanical strength that allows the glass substrate to sufficiently withstand the situations, as well as high Young's modulus and surface hardness. When the Young's modulus is maintained at 85 GPa or greater in the composition range of the glass of the present invention, it is possible to satisfy other properties as well. This Young's modulus is more preferably 85.5 GPa or greater, and most preferably 86 GPa or greater.

However, even though the glass substrate has simply high toughness, if the glass substrate has high specific gravity, bending occurs upon high speed rotation due to the large weight of the glass substrate, and the glass substrate generates vibration. On the contrary, even though the glass substrate has low specific gravity, if the glass substrate has small toughness, similarly vibration is generated. Furthermore, there is a problem that an increase in the weight causes an increase in the electric power consumption. In addition, if the specific gravity is made excessively low, consequently it becomes difficult to obtain a desired mechanical strength. Therefore, a balance must be taken between apparently contradictory characteristics such as high toughness and low specific gravity, and its preferred range is such that the value expressed in Young's modulus [GPa]/specific gravity is 33.0 or greater, more preferably 33.5 or greater, and most preferably 33.9 or greater. Here, since it is better with higher values of specific modulus, the upper limit value is not particularly limited.

The $SiO_2$ component is a component that forms the glass network structure and is essentially contained to achieve enhancement of chemical stability or reduction of specific gravity. When the amount is less than 52%, the resulting glass has insufficient chemical durability. Since the specific gravity tends to increase along with an increase in the contents of other components, the lower limit of the content of the $SiO_2$ component is preferably 52%, more preferably 53%, and even more preferably 54%. Furthermore, if the content is greater than 67%, an increase in viscosity leads to difficulties in fusion and press molding, and homogeneity of the material or refining effects are prone to be reduced. Accordingly, it is preferable to set the upper limit of the content at 67%, more preferably at 66%, and most preferably at 65%.

The $Al_2O_3$ component is an important component that contributes to stabilization of the glass and enhancement of chemical durability. However, if the amount is less than 3%, the effects are insufficiently. Therefore, the lower limit of the content is preferably 3%, more preferably 4%, and most preferably 5%. Furthermore, if the amount is greater than 15%, fusibility, moldability and resistance to devitrification are rather deteriorated, and homogeneity or refining effects are prone to be reduced. Accordingly, it is preferable to set the upper limit of the content at 15%, more preferably at 14%, and most preferably at 13%.

The $P_2O_5$ component offers an effect of suppressing crack propagation in the glass, and therefore can contribute to an increase in Vickers hardness. On the other hand, the component contributes to viscosity reduction, and also enhances melting and ref inability of raw glass when present together with $SiO_2$. In order to obtain these effects, it is necessary to set the lower limit of the content at least 0.2%. In order to obtain these effects more easily, it is preferable to set the lower limit of the content at 0.3%, and most preferably at 0.5%. However, if this component is added in excess, it becomes to achieve vitrification, and devitrification or phase separation is prone to occur. Thus, it is preferable to set the upper limit of the content at 8%, more preferably at 6%, and most preferably at 4%.

The $Li_2O$ component is a component which is preferably added so as to promote the reduction of viscosity of the glass, enhancement of moldability, enhancement of homogeneity, and chemical strengthening. On the other hand, chemical durability is important in the use of the glass as a substrate for an information recording medium, the amount of eluted alkali components should be suppressed to the minimum. Therefore, the lower limit of the content of the $Li_2O$ component is preferably 2.9%, and more preferably 3.0%. The upper limit of the content of the $Li_2O$ component is preferably set at 8%, more preferably at 7.5%, and most preferably at 7%.

The respective components of $TiO_2$, $ZrO_2$, $MgO$, $CaO$ and $ZnO$ are components that contribute to enhancement of Young's modulus, while generally suppressing the increase of the specific gravity of the glass as much as possible. The present inventors found that when the total amount of these components is adjusted to a specific range, it is easier to obtain a desired value of the ratio of Young's modulus to specific gravity. That is, if the total amount of one or more selected from these components exceeds 20%, the specific gravity value becomes excessively large. If the total amount thereof is less than 10%, the Young's modulus and the ratio of Young's modulus to specific gravity cannot be satisfied. Therefore, the upper limit of the total content of these components is preferably 20%, and more preferably 19%, and an even more preferred upper limit value is 18%. Furthermore, the lower limit value is preferably 5%, more preferably 11%, and even more preferably 12%.

The MgO, CaO and ZnO components are components that contribute to the reduction of specific gravity of the glass and enhancement of Young's modulus, and since they are also effective in the reduction of viscosity of the glass, they can be added as optional components. However, if the content of MgO exceeds 20%, the content of CaO exceeds 10%, or the content of ZnO exceeds 10%, the specific gravity of raw glass is increased, and it is difficult to obtain a desired glass. Therefore, the upper limits of the contents of these components are 20% for MgO, 10% for CaO and 10% for ZnO, more preferred upper limit values are 18% for MgO, 8% for CaO and 7% for ZnO, and even more preferred upper limit values are 15% for MgO, 6% for CaO and 5% for ZnO.

The $ZrO_2$ component contributes to enhancement of Young's modulus of the glass and enhancement of chemical durability, and thus can be optionally added. However, if the amount of addition of this component exceeds 11%, a melt residue or $ZrSiO_4$ (zircon) is likely to be generated, and the glass specific gravity is increased. Therefore, it is preferable to set the upper limit of the content at 13%, more preferably at 10%, and most preferably at 9%.

The $TiO_2$ component is a component that contributes to enhancement of Young's modulus of the glass, viscosity reduction and enhancement of chemical durability, and can be optionally added. However, if the amount of addition of this component exceeds 16%, the specific gravity of the glass is increased, and furthermore, vitrification is difficult to achieve. Therefore, the upper limit of the content is preferably set at 16%, more preferably at 13%, and most preferably at 12%.

The $B_2O_3$ component contributes to the reduction of viscosity of the glass and improves solubility and moldability, and thus the component can be added as an optional component. However, if the content of this component exceeds 6%, it is difficult to satisfy the mechanical properties, while raw glass easily undergoes phase separation, and vitrification is difficult to achieve. Therefore, it is preferable to set the upper limit of the content at 6%. A more preferred upper limit value is 5.5%.

The $Na_2O$ component and $K_2O$ component are components that bring about reduction of viscosity of the glass, enhancement of moldability and enhancement of homogeneity, similarly to the case of the $Li_2O$ component, but these components make the specific gravity of the glass higher as compared with the $Li_2O$ component. However, since these components have larger ionic radii than that of the $Li_2O$ component, their effect of alkali migration from the substrate is smaller compared with Li, and since these components give an effect that makes it easier to design the glass to have a higher average coefficient of linear expansion, these components may be incorporated together with the $Li_2O$ component. Even under such circumstances, the amount of eluted alkali components must be maintained at the minimum required. Therefore, the upper limit of the content of the $Na_2O$ component is preferably 10%, more preferably 9%, and most preferably 8%. The upper limit of the content of the $K_2O$ component is preferably set at 7%, more preferably at 5%, and most preferably at 3%.

The BaO component and the SrO component are components that are effective in the reduction of viscosity of the glass, enhancement of chemical durability and mechanical improvement. These components have the same function as that of the MgO, CaO and ZnO component, but on the other hand, they tend to render the glass specific gravity higher than the MgO, CaO and ZnO components. Therefore, it is preferable not to incorporate these components as far as possible.

In order to obtain high refining effects while maintaining the properties required of a substrate for an information recording medium, it is preferable to incorporate one or more components selected from a $SnO_2$ component and a $CeO_2$ component, as a main refining component. In order to obtain a high refining effect, the lower limit of the content of the $SnO_2$ component or the $CeO_2$ component, or of the total content of the two components, is preferably 0.05%, more preferably 0.1%, and most preferably 0.15% on the oxide basis.

On the other hand, in order to maintain the specific gravity low and obtain a high refining effect while maintaining the mechanical strength, and to increase the reboil suppressing effect upon direct pressing, the upper limit of the content of one or more components selected from the $SnO_2$ component and the $CeO_2$ component is preferably 1%, more preferably 0.7%, and most preferably 0.5%.

An $As_2O_3$ component or a $Sb_2O_3$ component, and $Cl^-$, $NO^-$, $SO_2^-$ and $F^-$ components operate as refining agents, but they are components which may be harmful to the environment, and use thereof should be avoided. The glass of the present invention can have a refining effect even without containing the $As_2O_3$ component or the $Sb_2O_3$ component, and when these components and the refining agent component of the present invention are added together, the refining agents may cancel out the refining effects of each other.

$Gd_2O_3$, $La_2O_3$, $Y_2O_3$, $Nb_2O_5$, $Ga_2O_3$ and $WO_3$ components contribute to the reduction of viscosity of the glass, an enhancement of mechanical properties due to enhancement of Young's modulus, and enhancement of heat resistance, and can be therefore added as optional components. However, an increase in the amount of addition calls for an increase in the specific gravity or an increase in the cost for raw materials. Therefore, the amount is such that the total amount of one or more of these components is sufficient at up to 5%, and if the total amount exceeds 5%, the specific gravity, Young's modulus and specific modulus of rigidity are not satisfied. Therefore, it is preferable to set the upper limit of the total amount of these components at 5%, more preferably at 4%, and most preferably at 3%.

V, Cu, Mn, Cr, Co, Mo, Ni, Fe, Te, Pr, Nd, Er, Eu, Sm components and the like, which are used as colorant components for glass, can be added for the purpose of distinguishing the type of glass by using the fluorescent property caused by these components and preventing mixing with other types of glass at the site of production or the like. However, since these components bring about an increase in specific gravity, an increase in the cost for raw materials and a decrease in glass forming capability, the amount is such that the total amount of one or more of these components is sufficient at up to 5%. Therefore, the upper limit of the total amount of these components is preferably set at 5%, more preferably at 4%, and most preferably at 3%, on the oxide basis.

In the glass substrate of the present invention, the damage caused by alkali migration to the magnetic film formed on the substrate surface can be suppressed, as the content of Li present at the surface is decreased by substituting Li with other components having larger ionic radii than that of Li.

In particular, many of the causes of alkali migration are caused by elution of alkali components from an end surface of the substrate where a magnetic film or the like is not formed.

For this reason, it is preferable to reduce the Li content particularly at near the substrate end surfaces, and it is preferable that, when the content ratio of $Li_2O$ component on the oxide basis in the region in the glass substrate for an information recording medium which extends from an end surface to a depth of 5 μm toward the center (hereinafter, referred to as "end surface region") is designated as α%, and the content ratio of the Li$_2$O component on the oxide basis in the region in the glass substrate for the information recording medium which extends from beyond a depth of 5 μm from an end surface toward the center (hereinafter, referred to as "inner region"), within the region inside the glass substrate which extends from a depth of 5 μm from one main surface to a depth of 5 μm from the other main surface along the thickness direction, is designated as β%, the ratio α/β be such that α/β≦1.

In the actual measurement of the Li content, it is advantageous to mainly use, for example, a method according to the ICP-AES method by sampling a portion of the glass in the end surface region and the inner region.

In the actual production process, the content ratio of the Li$_2$O component can be adjusted to the value described above, by substituting Li with another component, for example, Na or K, through an ion exchange treatment of the substrate obtained after polish processing. In this case, the two main surfaces of the glass substrate may be in a state of containing a reduced proportion of the Li$_2$O component as compared with the inner region by ion exchange, but upon considering the specific gravity of the substrate as a whole, it is preferable that the content ratio of the Li$_2$O component at the two main surfaces be equivalent to that in the inner region.

In order to achieve this state, a substrate may be produced by subjecting a blank to surface processing, subsequently substituting Li with another component, for example, Na or K, through an ion exchange treatment, and then eliminating the two main surfaces by polish processing.

Furthermore, if the glass substrate of the present invention is provided with a compressive stress layer on the surface, an effect of further enhancing the mechanical strength can be obtained.

As a method of forming a compressive stress layer, for example, there is available a chemical strengthening method involving an exchange reaction of the alkali component present at the surface layer of the glass substrate before forming a compressive stress layer, with an alkali component having a larger ionic radius. There are also available a thermal strengthening method of heating a glass substrate and then rapidly cooling the glass substrate; and an ion injection method of injecting ions to the surface layer of the glass substrate.

In the chemical strengthening method, for example, glass is immersed in the molten salt of a salt containing potassium or sodium, for example, potassium nitrate (KNO$_3$), sodium nitrate (NaNO$_3$) or a composite salt thereof, at a temperature of 300 to 600° C. for 0.5 to 12 hours. Thereby, an exchange reaction of the lithium component (Li$^+$ ion) present in the glass components at near the substrate surface, with a sodium component (Na$^+$ ion) or a potassium component (K$^+$ ion), which are both alkali components with larger ionic radii than that of Li; or an exchange reaction of the sodium component (Na$^+$ ion) present in the glass components at near the substrate surface, with a potassium component which is an alkali component having a larger ionic radium than that of the sodium component, proceeds. Then, there occurs an increase in volume of crystallized glass, and a compressive stress is generated inside the glass substrate surface layer. As a result, the ring flexural strength, which is an index of impact properties, undergoes an increase.

The thermal strengthening method is not particularly limited, but for example, a compressive stress layer which is generated by the temperature difference between the surface and the inside of the glass substrate, can be formed by heating the glass substrate to 300° C. to 600° C., and then conducting rapid cooling such as water cooling and/or air cooling. Furthermore, when the thermal strengthening method is combined with the chemical strengthening method described above, a compressive stress layer can be formed more effectively.

In regard to the glass substrate of the present invention, the mechanical strength or Young's modulus can be increased by inducing phase separation or generating crystals inside the glass by heat treating a bulk glass body at room temperature, which has been obtained by melting. Upon producing crystallized glass, a glass raw material containing the raw material of the various components mentioned above is melted and rapidly cooled to thereby produce raw glass, and the raw glass is heat treated and subjected to a nucleation process. After this nucleation process, the raw glass is heat treated at a temperature higher than that used in the nucleation process, and thereby a crystal growth process is carried out.

In order to produce a substrate for an information recording medium of the present invention, molten glass produced under the conditions described above is dropped into a lower frame, and the glass is pressed with an upper frame and a lower frame, thereby molding the glass into a disk shape. The glass substrate is subjected to shaping processing according to necessity, and then may be subjected to lapping processing and polish processing by known methods. According to the present invention, when currently established processing methods such as polishing are used, surface properties with an Ra of 2 Å (angstrom) or less can be obtained. Furthermore, also when the glass substrate is washed with, for example, an acid such as hydrofluoric acid, or an alkali so as to eliminate residual polishing materials during the polish processing, surface properties with an Ra of 2 Å (angstrom) or less can be maintained.

More specifically, the glass substrate for the information recording medium of the present invention is produced by the following method. First, raw materials such as oxides, carbonates and nitrates are mixed so as to have the glass constituent components in the composition ranges described above, and the mixture is melted using a conventional melting apparatus which makes use of a crucible made of platinum, quartz or the like, to a temperature which gives a viscosity of the glass melt of 1.5 to 3.0 dPa·s. Next, the temperature of the glass melt is raised to a temperature which gives a viscosity of 1.0 to 2.3 dPa·s, and preferably 1.2 to 2.2 dPa·s, and bubbles are generated within the glass melt to induce a stirring effect, so that the degree of homogeneity is increased. Subsequently, the temperature of the glass melt is lowered to a temperature which gives a viscosity of 1.8 to 2.6 dPa·s, and preferably 2.0 to 2.5 dPa·s, and removal of the bubbles generated inside the glass and refining are carried out. Then, this temperature is maintained.

Next, the temperature of the upper frame of the press molding frames is set at 300±100° C., and preferably at 300±50° C., and the temperature of the lower frame is set at Tg of the glass ±50° C., and preferably Tg±30° C.

Furthermore, the temperature of a glass discharge pipe for guiding the glass from the crucible to the press molding frames, is set at a temperature which gives a viscosity of the glass of 2.0 to 2.6 dPa·s, and preferably 2.1 to 2.5 dPa·s. A predetermined amount of the glass is dropped on the lower frame, the upper frame and the lower frame are approached to press, and thereby a glass molded product is obtained.

In the production of the substrate for the information recording medium, since cost reduction per sheet of glass is demanded, pressing is carried out at high speed, such as a press speed of 150 to 700 mm/sec and a cycle time (time taken from the initiation of pressing to a subsequent initiation of pressing) of 1 to 2 seconds. However, even under the impact of such pressing process, when the glass of the present invention is used, and the temperature of the glass melt and the temperature of the production apparatus are managed as described above, the occurrence of reboil during pressing can be suppressed.

Next, the glass substrate is lapped with abrasive grains having an average particle size of 5 to 30 μm, for about 10 minutes to 60 minutes, and after inner and outer diameter processing, the glass substrate is polished for about 30 minutes to 60 minutes using loose abrasive grains made of cerium oxide or the like, which have an average particle size obtained of 0.5 μm to 2 μm. Thereby, a substrate for an information recording medium can be obtained. The lapping and polishing processes are not limited to the processes as described above, and known methods may be appropriately used.

EXAMPLES

Hereinafter, suitable Examples of the present invention will be explained. However, the present invention is not intended to be limited to these Examples.

The glasses of the Examples of the present invention were all produced as follows. Raw materials of oxides and carbonates were mixed, and this mixture was fused at a temperature of about 1200 to 1400° C. using a crucible made of quartz or platinum. The batch that served as the raw material was sufficiently fused so that any melt residue would not be generated. The resulting batch was heated to a temperature of about 1350 to 1500° C. and then cooled to a temperature of 1450 to 1250° C., so as to carry out removal of the bubbles generated inside the glass and refining. Subsequently, while the temperature was maintained, a predetermined amount of glass was discharged and molded into a disk shape by a direct press method, with the temperature of the upper frame set at 300±100° C. and the temperature of the lower frame set at Tg±50° C. The molded disk was cooled, and thus a glass molded product was obtained. Subsequently, the obtained glass molded product was subjected to lapping and polishing by the method described above, and to washing with hydrofluoric acid for removal of abrasives, and thus a substrate for an information recording medium was obtained. The surface roughness Ra (arithmetic mean roughness) of the substrates thus obtained was all 2 A (angstrom) or less. Here, the surface roughness Ra (arithmetic mean roughness) was measured with an atomic force microscope (AFM).

The glass composition (mass %), specific gravity of the substrate obtained after press molding, Vickers hardness, Young's modulus, the ratio of Young's modulus to specific gravity (Young's modulus/specific gravity), and the average coefficient of linear expansion at 25° C. to 100° C., of Examples 1 to 44 and Comparative Examples 1 and 2 are presented in Table 1 to Table 8.

Furthermore, a temperature-viscosity graph of the glass of the present invention is shown in FIG. 1.

The viscosity of the glass was measured using a drawing ball viscometer (BVM-13LH manufactured by OPT Corp.).

The average coefficient of linear expansion refers to a value measured in conformity with JOGIS (Japanese Optical Glass Industrial Standard) 16-2003 "Measuring method for average linear thermal expansion coefficient of optical glass at normal temperature," by varying the temperature range from 25° C. to 100° C.

The specific gravity was measured using an Archimedes's method, while Young's modulus was measured using an ultrasonic method.

Vickers hardness refers to a value obtained by measuring a load (N) using a square pyramid-shaped diamond indenter with opposite sides meeting at the apex at an angle of 136°, by making a pyramid-shaped indentation on the test surface, and dividing the load by the surface area ($mm^2$) calculated from the length of the indentation. The measurement was made using a microhardness meter MVK-E manufactured by Akashi Seishakusho, Ltd., under a test load of 2.94 (N) and at a retention time of 15 (seconds).

TABLE 1

| | Example No. | | | | | |
|---|---|---|---|---|---|---|
| | 1 | 2 | 3 | 4 | 5 | 6 |
| $SiO_2$ | 59.60 | 59.60 | 59.60 | 59.60 | 60.10 | 61.60 |
| $P_2O_5$ | 3.00 | 3.00 | 3.00 | 3.00 | 3.00 | 3.00 |
| $Al_2O_3$ | 8.00 | 8.00 | 8.00 | 8.00 | 8.00 | 9.00 |
| $B_2O_3$ | 2.00 | | | 2.00 | 2.00 | 1.00 |
| $Li_2O$ | 6.00 | 6.00 | 6.00 | 6.00 | 5.00 | 5.00 |
| $K_2O$ | 2.00 | 2.00 | 2.00 | 2.00 | 1.00 | 1.00 |
| $Na_2O$ | 4.00 | 4.00 | 6.00 | 4.00 | 8.00 | 6.00 |
| MgO | 1.50 | 3.50 | 1.50 | 1.50 | 3.50 | 1.50 |
| CaO | 1.00 | 1.00 | 1.00 | 1.00 | | 1.00 |
| ZnO | 1.50 | 1.50 | 1.50 | 1.50 | | 1.50 |
| $ZrO_2$ | 4.00 | 2.00 | 2.00 | 3.00 | 8.00 | 6.00 |
| $TiO_2$ | 7.00 | 9.00 | 9.00 | 8.00 | 1.00 | 3.00 |
| $SnO_2$ | | 0.40 | | | 0.40 | |
| $CeO_2$ | 0.40 | | 0.40 | 0.40 | | 0.40 |
| Total | 100 | 100 | 100 | 100 | 100 | 100 |
| $MgO + CaO + ZnO + TiO_2 + ZrO_2$ | 15.00 | 17.00 | 15.00 | 15.00 | 12.50 | 13.00 |
| Specific gravity | 2.561 | 2.576 | 2.571 | 2.557 | 2.561 | 2.534 |
| Vickers hardness | 700 | 720 | 700 | 705 | 700 | 690 |
| Young's modulus (GPa) | 89.3 | 89.6 | 88.9 | 89.0 | 87.9 | 86.1 |
| Young's modulus/specific gravity | 34.9 | 34.8 | 34.6 | 34.8 | 34.3 | 34.0 |
| Average coefficient of linear expansion ($\times 10^{-7} \cdot °C^{-1}$) | 73 | 73 | 76 | 73 | 75 | 68 |

TABLE 2

|  | Example No. | | | | | |
| --- | --- | --- | --- | --- | --- | --- |
|  | 7 | 8 | 9 | 10 | 11 | 12 |
| $SiO_2$ | 60.60 | 61.60 | 64.60 | 63.60 | 59.60 | 59.60 |
| $P_2O_5$ | 3.00 | 3.00 | 2.00 | 2.00 | 3.00 | 3.00 |
| $Al_2O_3$ | 9.00 | 8.00 | 6.00 | 6.00 | 8.00 | 8.00 |
| $B_2O_3$ | 3.00 | 1.00 | 1.00 | 1.00 | 2.00 | 2.00 |
| $Li_2O$ | 5.00 | 5.00 | 4.00 | 4.00 | 5.00 | 5.00 |
| $K_2O$ | 1.00 | 1.00 |  |  | 1.00 | 1.00 |
| $Na_2O$ | 6.00 | 6.00 | 6.00 | 5.00 | 6.00 | 6.00 |
| MgO | 2.00 | 2.00 | 3.00 | 3.00 | 3.00 | 3.00 |
| CaO | 2.00 | 1.00 |  |  | 1.00 | 1.00 |
| ZnO |  |  |  |  |  |  |
| $ZrO_2$ | 5.00 | 4.00 | 4.00 | 4.00 | 4.00 | 3.00 |
| $TiO_2$ | 3.00 | 7.00 | 9.00 | 11.00 | 7.00 | 8.00 |
| $SnO_2$ |  |  | 0.20 |  |  |  |
| $CeO_2$ | 0.40 | 0.40 | 0.20 | 0.40 | 0.40 | 0.40 |
| Total | 100 | 100 | 100 | 100 | 100 | 100 |
| $MgO + CaO + ZnO + TiO_2 + ZrO_2$ | 12.00 | 14.00 | 16.00 | 18.00 | 15.00 | 15.00 |
| Specific gravity | 2.532 | 2.542 | 2.540 | 2.551 | 2.556 | 2.551 |
| Vickers hardness | 700 | 720 | 730 | 720 | 700 | 700 |
| Young's modulus (GPa) | 86.1 | 86.5 | 86.8 | 87.9 | 87.9 | 88.1 |
| Young's modulus/specific gravity | 34.0 | 34.0 | 34.2 | 34.5 | 34.4 | 34.5 |
| Average coefficient of linear expansion ($\times 10^{-7} \cdot °C.^{-1}$) | 71 | 70 | 68 | 69 | 70 | 71 |

TABLE 3

|  | Example No. | | | | | |
| --- | --- | --- | --- | --- | --- | --- |
|  | 13 | 14 | 15 | 16 | 17 | 18 |
| $SiO_2$ | 60.60 | 59.60 | 61.10 | 60.60 | 59.60 | 58.60 |
| $P_2O_5$ | 2.00 | 2.00 | 3.00 | 3.00 | 2.00 | 2.00 |
| $Al_2O_3$ | 8.00 | 8.00 | 8.00 | 8.00 | 8.00 | 8.00 |
| $B_2O_3$ | 2.00 | 2.00 | 1.00 | 1.00 | 2.00 | 2.00 |
| $Li_2O$ | 5.00 | 5.00 | 5.00 | 5.00 | 4.00 | 4.00 |
| $K_2O$ | 1.00 | 1.00 | 1.00 | 1.00 | 1.00 | 1.00 |
| $Na_2O$ | 6.00 | 6.00 | 6.00 | 6.00 | 7.00 | 7.00 |
| MgO | 3.00 | 3.00 | 2.00 | 2.00 | 3.00 | 3.00 |
| CaO | 1.00 | 1.00 | 1.00 | 1.00 | 1.00 | 1.00 |
| ZnO |  |  |  |  |  |  |
| $ZrO_2$ | 3.00 | 3.00 | 4.00 | 4.00 | 3.00 | 3.00 |
| $TiO_2$ | 8.00 | 9.00 | 7.00 | 7.00 | 9.00 | 9.00 |
| $WO_3$ |  |  | 0.50 | 1.00 |  | 1.00 |
| $CeO_2$ | 0.40 | 0.40 | 0.40 | 0.40 | 0.40 | 0.40 |
| Total | 100 | 100 | 100 | 100 | 100 | 100 |
| $MgO + CaO + ZnO + TiO_2 + ZrO_2$ | 15.00 | 16.00 | 14.00 | 14.00 | 16.00 | 16.00 |
| Specific gravity | 2.556 | 2.567 | 2.552 | 2.560 | 2.568 | 2.585 |
| Vickers hardness | 700 | 700 | 710 | 700 | 700 | 700 |
| Young's modulus (GPa) | 88.9 | 88.2 | 87.2 | 88.1 | 87.4 | 88.0 |
| Young's modulus/specific gravity | 34.8 | 34.3 | 34.2 | 34.4 | 34.0 | 34.0 |
| Average coefficient of linear expansion ($\times 10^{-7} \cdot °C.^{-1}$) | 70 | 70 | 69 | 70 | 70 | 70 |

TABLE 4

|  | Example No. | | | | | |
| --- | --- | --- | --- | --- | --- | --- |
|  | 19 | 20 | 21 | 22 | 23 | 24 |
| $SiO_2$ | 59.60 | 57.60 | 58.60 | 58.60 | 57.60 | 57.60 |
| $P_2O_5$ | 3.00 | 3.00 | 3.00 | 3.00 | 3.00 | 3.00 |
| $Al_2O_3$ | 10.00 | 12.00 | 8.00 | 8.00 | 8.00 | 8.00 |
| $B_2O_3$ | 1.00 | 1.00 | 1.00 | 1.00 | 2.00 | 2.00 |
| $Li_2O$ | 5.00 | 5.00 | 5.00 | 5.00 | 5.00 | 5.00 |

TABLE 4-continued

|  | Example No. | | | | | |
| --- | --- | --- | --- | --- | --- | --- |
|  | 19 | 20 | 21 | 22 | 23 | 24 |
| $K_2O$ | 1.00 | 1.00 | 2.00 | 2.00 | 2.00 | 2.00 |
| $Na_2O$ | 6.00 | 6.00 | 8.00 | 8.00 | 8.00 | 8.00 |
| MgO | 2.00 | 2.00 | 2.00 | 2.00 | 2.00 | 2.00 |
| CaO | 1.00 | 1.00 | 1.00 | 1.00 | 1.00 | 1.00 |
| ZnO |  |  |  |  |  |  |
| $ZrO_2$ | 4.00 | 4.00 | 4.00 | 3.00 | 3.00 | 2.00 |
| $TiO_2$ | 7.00 | 7.00 | 7.00 | 8.00 | 8.00 | 9.00 |
| $WO_3$ |  |  |  |  |  |  |
| $CeO_2$ | 0.40 | 0.40 | 0.40 | 0.40 | 0.40 | 0.40 |
| Total | 100 | 100 | 100 | 100 | 100 | 100 |
| $MgO + CaO + ZnO + TiO_2 + ZrO_2$ | 14.00 | 14.00 | 14.00 | 14.00 | 14.00 | 14.00 |
| Specific gravity | 2.546 | 2.552 | 2.571 | 2.565 | 2.567 | 2.564 |
| Vickers hardness | 690 | 690 | 700 | 700 | 700 | 700 |
| Young's modulus (GPa) | 87.5 | 88.3 | 87.6 | 87.1 | 87.7 | 87.5 |
| Young's modulus/specific gravity | 34.4 | 34.6 | 34.1 | 34.0 | 34.2 | 34.1 |
| Average coefficient of linear expansion ($\times 10^{-7} \cdot °C^{-1}$) | 70 | 71 | 72 | 73 | 72 | 71 |

TABLE 5

|  | Example No. | | | | | |
| --- | --- | --- | --- | --- | --- | --- |
|  | 25 | 26 | 27 | 28 | 29 | 30 |
| $SiO_2$ | 58.60 | 58.60 | 59.60 | 58.60 | 57.60 | 58.10 |
| $P_2O_5$ | 3.00 | 3.00 | 1.00 | 1.00 | 1.00 | 1.00 |
| $Al_2O_3$ | 8.00 | 8.00 | 8.00 | 8.00 | 8.00 | 8.00 |
| $B_2O_3$ | 2.00 | 3.00 | 3.00 | 3.00 | 5.00 | 3.00 |
| $Li_2O$ | 5.00 | 5.00 | 5.00 | 5.00 | 5.00 | 5.00 |
| $K_2O$ | 2.00 | 2.00 | 2.00 | 2.00 | 2.00 | 2.00 |
| $Na_2O$ | 6.00 | 5.00 | 6.00 | 6.00 | 6.00 | 6.00 |
| MgO | 1.50 | 1.50 | 3.00 | 3.00 | 3.00 | 4.50 |
| CaO | 1.00 | 1.00 | 1.00 | 1.00 | 1.00 | 1.00 |
| ZnO | 1.50 | 1.50 |  |  |  |  |
| $ZrO_2$ | 4.00 | 4.00 | 2.00 | 2.00 | 4.00 | 4.00 |
| $TiO_2$ | 7.00 | 7.00 | 9.00 | 7.00 | 7.00 | 7.00 |
| $WO_3$ |  |  |  | 3.00 |  |  |
| $CeO_2$ | 0.40 | 0.40 | 0.40 | 0.40 | 0.40 | 0.40 |
| Total | 100 | 100 | 100 | 100 | 100 | 100 |
| $MgO + CaO + ZnO + TiO_2 + ZrO_2$ | 15.00 | 15.00 | 15.00 | 13.00 | 15.00 | 16.50 |
| Specific gravity | 2.572 | 2.561 | 2.561 | 2.590 | 2.569 | 2.586 |
| Vickers hardness | 710 | 710 | 700 | 710 | 700 | 700 |
| Young's modulus (GPa) | 90.8 | 89.3 | 89.4 | 88.0 | 89.0 | 90.8 |
| Young's modulus/specific gravity | 35.3 | 34.9 | 34.9 | 34.0 | 34.6 | 35.1 |
| Average coefficient of linear expansion ($\times 10^{-7} \cdot °C^{-1}$) | 71 | 70 | 72 | 71 | 70 | 71 |

TABLE 6

|  | Example No. | | | | | |
| --- | --- | --- | --- | --- | --- | --- |
|  | 31 | 32 | 33 | 34 | 35 | 36 |
| $SiO_2$ | 58.10 | 58.10 | 58.10 | 58.10 | 58.10 | 58.10 |
| $P_2O_5$ | 1.00 | 1.00 | 1.00 | 1.00 | 1.00 | 1.00 |
| $Al_2O_3$ | 8.00 | 8.00 | 8.00 | 8.00 | 8.00 | 8.00 |
| $B_2O_3$ | 3.00 | 3.00 | 3.00 | 3.00 | 3.00 | 3.00 |
| $Li_2O$ | 5.00 | 5.00 | 5.00 | 5.00 | 5.00 | 5.00 |
| $K_2O$ | 2.00 | 2.00 | 2.00 | 2.00 | 2.00 | 2.00 |

TABLE 6-continued

|  | Example No. | | | | | |
| --- | --- | --- | --- | --- | --- | --- |
|  | 31 | 32 | 33 | 34 | 35 | 36 |
| Na$_2$O | 6.00 | 6.00 | 5.00 | 6.00 | 6.00 | 6.00 |
| MgO | 3.00 | 3.00 | 6.00 | 5.00 | 2.50 | 7.50 |
| CaO | 2.50 | 2.50 | 2.50 | 2.50 | 5.00 |  |
| ZnO |  |  |  |  |  |  |
| ZrO$_2$ | 4.00 | 2.00 | 2.00 | 2.00 | 2.00 | 2.00 |
| TiO$_2$ | 7.00 | 9.00 | 7.00 | 7.00 | 7.00 | 7.00 |
| WO$_3$ |  |  |  |  |  |  |
| CeO$_2$ | 0.40 | 0.40 | 0.40 | 0.40 | 0.40 | 0.40 |
| Total | 100 | 100 | 100 | 100 | 100 | 100 |
| MgO + CaO + ZnO + TiO$_2$ + ZrO$_2$ | 16.50 | 16.50 | 17.50 | 16.50 | 16.50 | 16.50 |
| Specific gravity | 2.593 | 2.583 | 2.580 | 2.583 | 2.588 | 2.568 |
| Vickers hardness | 710 | 710 | 710 | 700 | 700 | 700 |
| Young's modulus (GPa) | 89.5 | 90.2 | 90.2 | 89.9 | 89.7 | 89.5 |
| Young's modulus/specific gravity | 34.5 | 34.9 | 35.0 | 34.8 | 34.7 | 34.9 |
| Average coefficient of linear expansion ($\times 10^{-7} \cdot °C^{-1}$) | 71 | 71 | 74 | 75 | 75 | 78 |

TABLE 7

|  | Example No. | | | | | |
| --- | --- | --- | --- | --- | --- | --- |
|  | 37 | 38 | 39 | 40 | 41 | 42 |
| SiO$_2$ | 58.10 | 58.10 | 58.10 | 58.10 | 59.60 | 59.60 |
| P$_2$O$_5$ | 1.00 | 1.00 | 1.00 | 1.00 | 1.00 | 1.00 |
| Al$_2$O$_3$ | 8.00 | 8.00 | 8.00 | 8.00 | 8.00 | 8.00 |
| B$_2$O$_3$ | 3.00 | 3.00 | 3.00 | 3.00 | 3.00 | 3.00 |
| Li$_2$O | 5.00 | 5.00 | 5.00 | 5.00 | 5.00 | 5.00 |
| K$_2$O | 2.00 | 2.00 | 2.00 | 2.00 | 2.00 | 2.00 |
| Na$_2$O | 6.00 | 6.00 | 6.00 | 6.00 | 4.00 | 4.00 |
| MgO | 7.50 | 6.00 | 6.50 | 7.50 | 8.00 | 13.00 |
| CaO | 5.00 | 2.50 | 4.00 | 2.00 | 5.00 |  |
| ZnO |  |  |  |  |  |  |
| ZrO$_2$ | 2.00 | 1.00 | 2.00 | 2.00 | 2.00 | 2.00 |
| TiO$_2$ | 2.00 | 7.00 | 4.00 | 5.00 | 2.00 | 2.00 |
| WO$_3$ |  |  |  |  |  |  |
| CeO$_2$ | 0.40 | 0.40 | 0.40 | 0.40 | 0.40 | 0.40 |
| Total | 100 | 100 | 100 | 100 | 100 | 100 |
| MgO + CaO + ZnO + TiO$_2$ + ZrO$_2$ | 16.50 | 16.50 | 16.50 | 16.50 | 17.00 | 17.00 |
| Specific gravity | 2.580 | 2.573 | 2.579 | 2.575 | 2.572 | 2.555 |
| Vickers hardness | 700 | 710 | 710 | 710 | 720 | 720 |
| Young's modulus (GPa) | 91.3 | 90.2 | 90.3 | 90.4 | 91.4 | 91.3 |
| Young's modulus/specific gravity | 35.4 | 35.1 | 35.0 | 35.1 | 35.6 | 35.7 |
| Average coefficient of linear expansion ($\times 10^{-7} \cdot °C^{-1}$) | 79 | 80 | 79 | 79 | 69 | 71 |

TABLE 8

|  | Example No. | | Comparative Example 1 | Comparative Example 2 |
| --- | --- | --- | --- | --- |
|  | 43 | 44 | | |
| SiO$_2$ | 58.10 | 58.10 | 60.8 | 67.0 |
| P$_2$O$_5$ | 1.00 | 1.00 |  |  |
| Al$_2$O$_3$ | 9.50 | 9.50 | 4.0 | 11.8 |
| B$_2$O$_3$ | 3.00 | 3.00 |  | 2.5 |
| Li$_2$O | 5.00 | 5.00 | 7.3 | 7.0 |
| K$_2$O | 2.00 | 2.00 |  | 2.0 |
| Na$_2$O | 4.00 | 4.00 | 3.9 | 3.5 |
| MgO | 8.00 | 13.00 | 4.3 |  |
| CaO | 5.00 |  | 5.8 |  |
| ZnO |  |  |  |  |
| ZrO$_2$ | 2.00 | 2.00 | 6.4 | 2.0 |
| TiO$_2$ | 2.00 | 2.00 | 7.3 | 2.0 |
| WO$_3$ |  |  |  | La$_2$O$_3$ 2.0 |

TABLE 8-continued

|  | Example No. 43 | Example No. 44 | Comparative Example 1 | Comparative Example 2 |
|---|---|---|---|---|
| $CeO_2$ | 0.40 | 0.40 | $Sb_2O_3$ 0.2 | $Sb_2O_3$ 0.2 |
| Total | 100 | 100 | 100 | 100 |
| MgO + CaO + ZnO + $TiO_2$ + $ZrO_2$ | 17.00 | 17.00 | 23.8 | 4.0 |
| Specific gravity | 2.574 | 2.562 | 2.685 | 2.48 |
| Vickers hardness | 710 | 710 | 640 | 610 |
| Young's modulus (GPa) | 91.2 | 92.2 | 98.6 | 83 |
| Young's modulus/specific gravity | 35.4 | 36.0 | 36.7 | 33.5 |
| Average coefficient of linear expansion ($\times 10^{-7} \cdot °C.^{-1}$) | 70 | 69 | 70 | 66 |

Example 45

A 2.5-inch polished substrate for HDD (65φ×0.635 mmt) of Example 8 was immersed in a salt mixture of potassium nitrate and sodium nitrate ($KNO_3$:$NaNO_3$=1:3) at 400° C. for 0.25 hours, and thereby a compressive stress layer was formed at the surface. It was confirmed that this substrate had its ring flexural strength improved to a value four times larger than the value obtained before forming the compressive stress layer (260 MPa). Here, the ring flexural strength means a flexural strength measured by a concentric ring bending method, in which a thin disk-shaped specimen having a diameter of 65 mm and a thickness of 0.635 mm is produced, and the strength of the disk-shaped specimen is measured using circular-shaped support ring and load ring.

Example 46

A 2.5-inch polished substrate for HDD (65φ×0.635 mmt) of Example 44 was immersed in a salt mixture of potassium nitrate and sodium nitrate ($KNO_3$:$NaNO_3$=1:3) at 400° C. for 0.5 hours, and thereby a compressive stress layer was formed at the surface. It was confirmed that this substrate had its ring flexural strength improved to a value eight times larger than the value obtained before forming the compressive stress layer (270 MPa).

Example 47

A 2.5-inch polished substrate for HDD (65φ×0.635 mmt) of Example 8 was heated to 300° C. to 600° C. and then was subjected to rapid cooling by an air cooling method, and thereby a compressive stress layer was formed at the surface. It was confirmed that this substrate had its ring flexural strength improved.

Example 48

A 2.5-inch polished substrate for HDD (65φ×0.635 mmt) of Example 34 was produced by a known method and was immersed in a salt mixture of potassium nitrate and sodium nitrate ($KNO_3$:$NaNO_3$=1:3) at 400° C. for 0.25 hours, and thereby a compressive stress layer was formed at the surface. It was confirmed that this substrate had its ring flexural strength improved to a value 3 to 6 times larger than the value obtained before forming the compressive stress layer (250 MPa).

Example 49

A 2.5-inch polished substrate for HDD (65φ×0.635 mmt) having the glass composition of Example 44 was produced by a known method, through polishing processes including a chemical strengthening treatment process, and the substrate surface was observed with an AFM at a field of vision of 3 μm². It was confirmed that the substrate had an Ra of 1.4 A, an Rq of 1.8 A, an Rmax of 15.5 A, and a microwaviness (μWa) of 0.72 A, and that the substrate was very excellent in the surface properties required of substrates for HDD of next generation.

The microwaviness (μWa) is one of the factors exerting influence on the electromagnetic conversion properties of magnetic recording media, and in order to obtain excellent electromagnetic conversion properties, the microwaviness needs to be reduced, as in the case of Ra. Measurement of the microwaviness may be carried out by optical interferometry (name of apparatus: Micro XAM) under the conditions of a band pass filter of 50 to 200 nm, along the circumferential direction in the directions of 0°, 90°, 180° and 270° of the upper and lower surfaces of the substrate.

Example 50

Furthermore, a chromium alloy undercoat layer and a cobalt alloy magnetic layer were formed on the substrate obtained by the Example described above, by a DC sputtering method, and a diamond-like carbon layer was further formed thereon. Subsequently, a perfluoropolyether-based lubricant was applied thereon, and thus a magnetic information recording medium was obtained.

The substrate of the present invention such as a substrate for magnetic recording medium or the like, can be made to have a large surface recording density, so that even if the substrate itself is made to rotate at high speed in order to increase the recording density, bending or deformation does not occur, and the vibration due to this rotation is reduced to thereby decrease the track mis-registration (TMR) caused by vibration or bending. Furthermore, since the substrate has excellent impact resistance properties, it hardly undergoes head crash or destruction of substrate particularly as an information recording medium for mobile applications and the like, and as a result, the substrate exhibits excellent stable operability.

What is claimed is:
1. A glass substrate for an information recording medium, comprising, as expressed in terms of percent by mass on an oxide basis:
   52 to 67% of $SiO_2$,
   3 to 14% of $Al_2O_3$,
   0.2 to 8% of $P_2O_5$,
   1.5 to 20% of MgO,
   0 to 10% of CaO,
   0 to 10% of ZnO,
   0 to 13% of $ZrO_2$,
   0 to 16% of $TiO_2$,
   0 to 1% of $CeO_2$,
   0 to 1% of $SnO_2$,
   0 to 6% of $B_2O_3$,
   4 to 10% of $Na_2O$, and
   0 to 7% of $K_2O$,
   wherein a total amount of MgO, CaO, ZnO, $ZrO_2$ and $TiO_2$ in the glass substrate is 5 to 20% by mass on the oxide basis, and the total amount of $CeO_2$ and/or $SnO_2$ is 0.05 to 1% by mass on the oxide basis, and the total amount $B_2O_3$, $Na_2O$, and/or $K_2O$ is 4 to 11%) by mass on the oxide basis, the glass substrate having a Young's modulus of 85 GPa or greater, a specific gravity of 2.60 or less, and a ratio of Young's modulus to specific gravity (Young's modulus/specific gravity) of 33.0 GPa or greater.

2. The glass substrate for an information recording medium according to claim 1, further comprising, as expressed in terms of percent by mass on the oxide basis:

2.9 to 8% $Li_2O$.

3. The glass substrate for an information recording medium according to claim 1, wherein the glass substrate does not contain $As_2O_3$ component and $Sb_2O_3$ component on the oxide basis, and $Cl^-$, $NO^-$, $SO^{2-}$ and $F^-$ components.

4. The glass substrate for an information recording medium according to claim 1, wherein the glass substrate does not contain BaO component or SrO component on the oxide basis.

5. The glass substrate for an information recording medium according to claim 1, wherein, when a content ratio of $Li_2O$ component on the oxide basis in a region inside the glass substrate for the information recording medium which extends from an end surface to a depth of 5 μm toward the center is designated as an α%, and the content ratio of the $Li_2O$ component n the oxide basis in the region in the glass substrate for the information recording medium which extends from beyond a depth of 5 μm from an end surface toward the center, within the region inside the glass substrate which extends from a depth of 5 μm from one main surface to a depth of 5 μm from an other main surface along the thickness direction, is designated as a β%, the ratio of α/β is 1 or less.

6. The glass substrate for an information recording medium according to claim 1, wherein the surface roughness Ra (arithmetic mean roughness) is 2 A or less.

7. An information recording medium making use of the glass substrate for an information recording medium according to claim 1.

* * * * *